(No Model.)
R. AITKEN.
APPARATUS FOR EXTRACTING GASES FROM MOLTEN METALS.
No. 310,012. Patented Dec. 30, 1884.
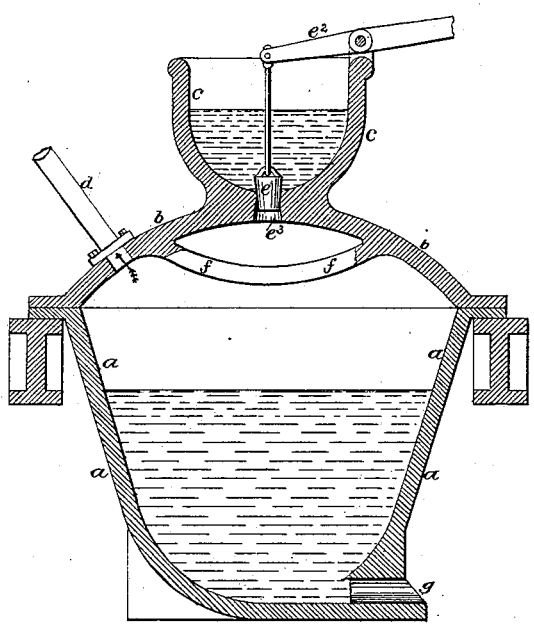
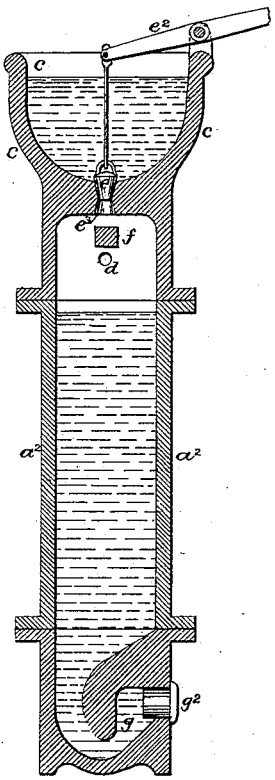

UNITED STATES PATENT OFFICE.

RUSSEL AITKEN, OF WESTMINSTER, COUNTY OF MIDDLESEX, ENGLAND.

APPARATUS FOR EXTRACTING GASES FROM MOLTEN METALS.

SPECIFICATION forming part of Letters Patent No. 310,012, dated December 30, 1884.

Application filed October 30, 1882. (No model.) Patented in England March 29, 1882, No. 1,533; in France September 29, 1882, No. 151,315; in Germany October 12, 1882, No. 22,170; in Belgium October 1st, 1882, No. 59,319; in Italy October 25, 1882, XVI, 14,720, and in Austria-Hungary February 24, 1883, No. 35,676 and No. 7,515.

*To all whom it may concern:*

Be it known that I, RUSSEL AITKEN, a subject of the Queen of Great Britain and Ireland, and residing at Great George Street, in the city of Westminster, county of Middlesex, England, have invented an Improved Apparatus for Extracting Gases from Molten Metals, (for which I have obtained a British patent, No. 1,533, March 29, 1882,) of which the following is a specification.

My invention consists of an improved construction of apparatus for extracting gases from molten iron, steel, glass, and other materials by subjecting the said materials while in the form of a stream or spray to the action of a vacuum, as fully described and claimed hereinafter.

In the accompanying drawings, Figure 1 is a vertical section of my apparatus, and Fig. 2 is a similar view of a modification.

In Fig. 1, $a$ represents a ladle, chamber, or vessel closed, so as to be air-tight, by a cover, $b$, having formed or carried thereon a receptacle, $c$, into which the molten metal or material to be treated is poured. Opening into the said vessel $a$ is a pipe or passage, $d$, leading to an air-pump or other exhauster, by means of which a vacuum or partial vacuum is created in the said vessel $a$. The opening $e^3$, forming the communication between the said vessel $a$ and the receptacle $c$, is closed by a valve, $e$, which can be opened by a lever, $e^2$. The valve $e$ being closed, and the air-pump or exhauster being set to work, a vacuum or partial vacuum is created in the vessel $a$ and the molten metal or material is run into the receptacle $c$. When a sufficient vacuum is established, the valve $e$ is raised and the molten metal or material passes in a stream or streams into and through the said vacuum or partial vacuum. A disperser, $f$, is provided to break up the material into a spray, to facilitate the separation of the occluded or inclosed gases. The action of the air-pump or exhauster being maintained, the gases escaping from the material are drawn from the chamber $a$, and may be condensed or treated in any desired or customary manner. The molten material thus freed, wholly or partially, from occluded gases may be taken out of the vessel $a$ in a solid state, after cooling, by removing the cover $b$; or the molten material may be drawn off by a special outlet, $g$, provided for the purpose, or may be removed in any other convenient way.

In the modified apparatus, Fig. 2, the large ladle, chamber, or vessel is dispensed with, and the molten material made to pass into and through a vacuum or partial vacuum in a chamber, $a^2$, from which the material, after treatment, continually passes off, the head of treated material being sufficient to secure the vacuum or partial vacuum. The receptacle $c$ at top communicates by a passage, $e^3$, (which may be closed by a valve, as shown,) with the chamber $a^2$. The opening $g$, at bottom, for the continuous escape of the treated molten metal or material will at first also require to be closed by a plug, $g^2$. There is a passage, $d$, leading to the air-pump or exhauster, and $f$ is the disperser. The passages $e^3$ and $g$ being closed and the air-pump or exhauster being worked, a vacuum or partial vacuum is created in the vessel $a^2$, and the valve $e$ is then raised, when the molten metal or material flows by the passage $e^3$ from the receptacle $c$ into the vessel $a^2$, and when a sufficient head is obtained the plug $g^2$ is forced out by the weight of the molten metal or material, and the molten metal or material flows out by the passage $g$. Thus, so long as a supply of untreated molten metal or material is passed into the receptacle $c$ a continuous flow of treated molten metal or material will be maintained from the passage $g$.

I do not desire to claim the method of extracting gases from molten metal by allowing the metal to pass in a state of subdivision into a chamber in which a vacuum is maintained. I am aware that this is old; but I believe that the construction of apparatus described is new, and therefore

I claim as my invention—

1. The herein-described apparatus for the extraction of gases from molten metal and other materials, said apparatus consisting of a closed chamber having an outlet to communicate with an exhaust, a receptacle above said chamber to receive the molten materials, and a valved opening between said receptacle and chamber, as set forth.

2. The combination of a closed chamber having an outlet communicating with the exhaust, and a plugged discharge-opening at the bottom, with a receptacle above the chamber, a valved communication between the two, and a disperser below the said communication, substantially as set forth.

In testimony whereof I have signed my name to this specification in the presence of two subscribing witnesses.

RUSSEL AITKEN.

Witnesses:
EDWD. GEO. DAVIES,
*Clerk to J. Henry Johnson, 47 Lincoln's Inn Fields, London, W. C.*
CHAS. JAS. JONES,
*47 Lincoln's Inn Fields, London.*